March 10, 1942. H. HASENBURGER ET AL 2,275,902
OUTLET STACK CONSTRUCTION FOR BUILDING HEATING SYSTEMS
Filed Aug. 22, 1940 2 Sheets-Sheet 1
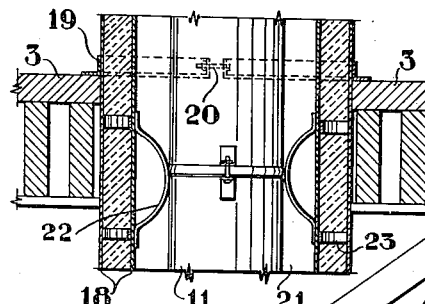
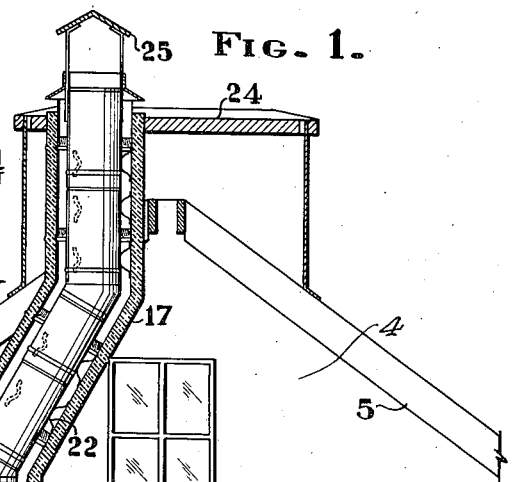
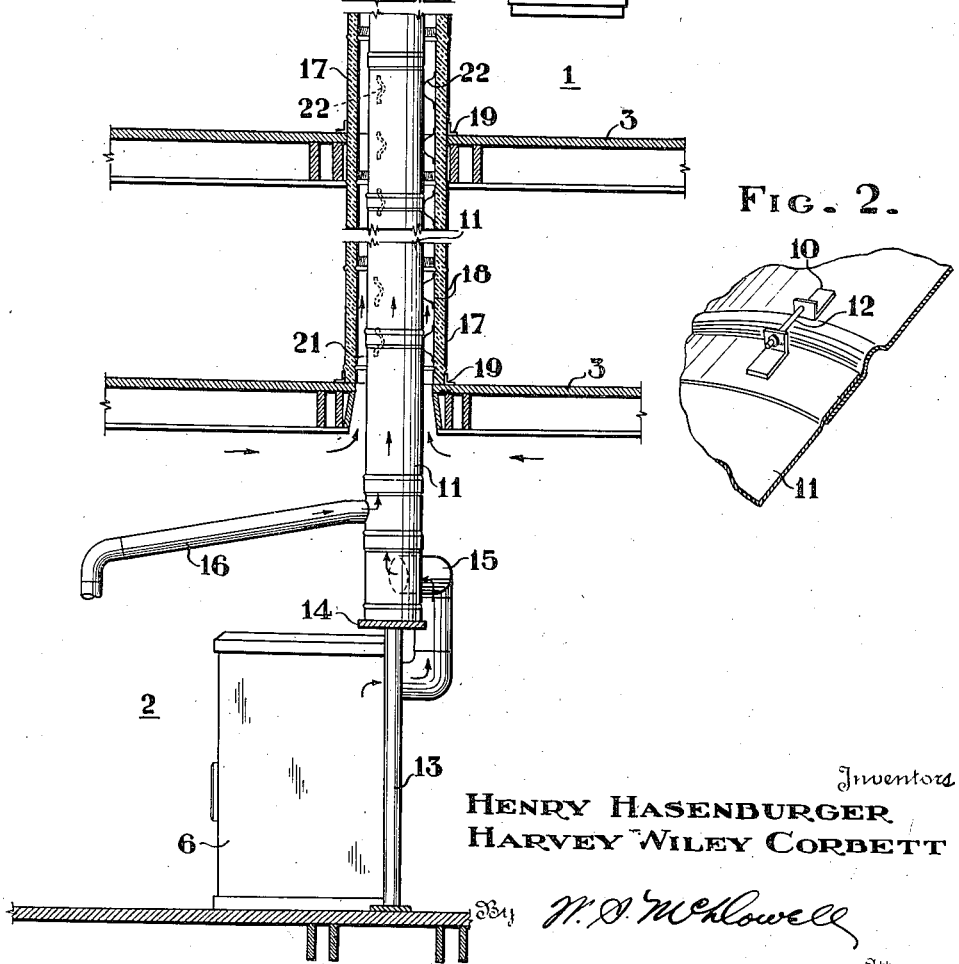
Inventors
HENRY HASENBURGER
HARVEY WILEY CORBETT
Attorney March 10, 1942.  H. HASENBURGER ET AL  2,275,902
OUTLET STACK CONSTRUCTION FOR BUILDING HEATING SYSTEMS
Filed Aug. 22, 1940  2 Sheets-Sheet 2
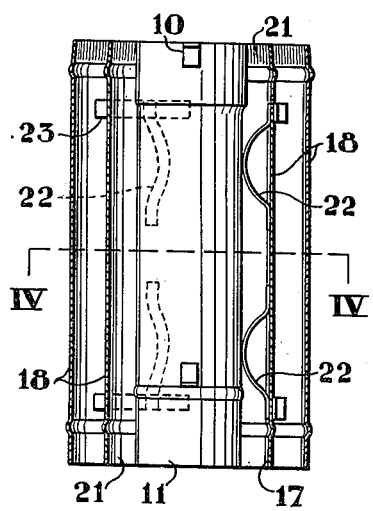
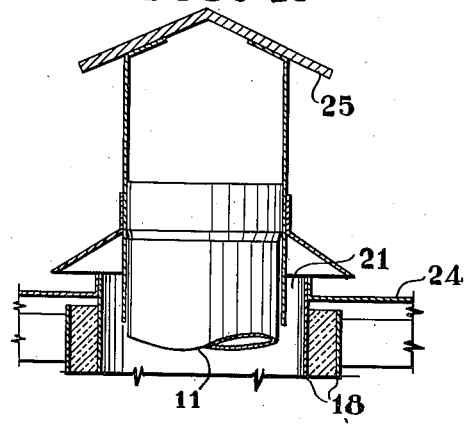
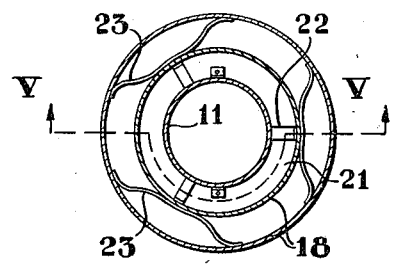
Inventors
HENRY HASENBURGER
HARVEY WILEY CORBETT
Attorney Patented Mar. 10, 1942

2,275,902

UNITED STATES PATENT OFFICE 2,275,902

OUTLET STACK CONSTRUCTION FOR BUILDING HEATING SYSTEMS

Henry Hasenburger, Newark, N. J., and Harvey Wiley Corbett, New York, N. Y., assignors to Prebilt Housing Corporation, New York, N. Y., a corporation of Ohio Application August 22, 1940, Serial No. 353,706

3 Claims. (Cl. 72—93)

This invention relates to an outlet stack assembly for building heating systems. The invention has for one of its leading objects, the provision of a stack construction of an efficient, inexpensive and readily installed type and, further, one which is thoroughly protected against fire hazards or the escape into the occupied rooms of the building of obnoxious furnace gases.

One of the factors entering into the relatively high costs of residential buildings is that of chimney construction for heating systems. Quite often, these chimneys or flues are formed from brick, stone and the like and require skilled labor, as well as costly materials, in producing the same.

It is therefore one of the fundamental objects of the invention to provide an outlet for furnace gases composed of a plurality of preformed sheet metal duct sections which extend from the furnace or heater and through the walls of the building to and through the roof thereof, the pipe column thus formed being surrounded by a jacket composed of inner and outer conduit sections containing thermal insulation, the arrangement being such as to provide a ventilating space leading from the furnace room to the roof around the pipe column formed by the conduit sections, whereby to provide a vent from the furnace room to the outside of the building to carry off fumes which may accumulate in the furnace room or which may escape from the interfitting joints of the duct sections, and also to thermally insulate the said pipe column and its duct sections from adjacent members of the building construction.

Another object resides in the provision of resilient spacing means for positioning and holding in proper relative order the duct sections of the pipe column and the conduit sections of the insulating jacket.

A still further object resides in the provision of means for supporting the weight of the vertically extending pipe column, which constitutes the outlet stack for the waste gases of a furnace, or other heater, and independent means for effecting the support of the conduit sections of said jacket.

With these and other objects in view that will appear as the description proceeds, the invention consists in the novel features of construction, combination of elements and arrangement of parts hereinafter more fully set forth.

In the accompanying drawings,

Fig. 1 is a vertical sectional view taken through a residential type of building, and disclosing the improved outlet and ventilating stack forming the present invention;

Fig. 2 is a detail perspective view, partly in section, disclosing the means employed for uniting the adjoining and interfitting ends of the duct sections used in forming the outlet stack for furnace gases;

Fig. 3 is a horizontal sectional view on the plane indicated by the line IV—IV of Fig. 5;

Fig. 4 is a detail vertical sectional view taken through the upper or outlet end of the stack;

Fig. 5 is a vertical sectional view, partly in side elevation of a portion of the outlet stack;

Fig. 6 is a detail vertical sectional view taken through the stack and the adjacent floor construction of a building.

Referring more particularly to the drawings, the numeral 1 designates a building of a residential type, although it will be understood that the invention is not limited in its scope to any particular type of building. However, the improved outlet stack is particularly well adapted for installation in low-cost residential buildings of the so-called prefabricated type.

As illustrated, the building 1 comprises a furnace or utility room 2, floors 3, vertical walls 4 and a roof 5, the specific construction of which does not enter directly into the present invention. Arranged within the room 2, is a furnace or heater 6 of any suitable design.

Leading from the room 2 and extending upwardly and substantially vertically through the building and the roof 5 is the outlet and ventilating stack forming the present invention. This stack comprises a plurality of sheet metal duct sections 11 having reenforced interfitting ends, as indicated in Fig. 2. These ends are preferably united by providing the duct sections with perforated brackets 10, which receive nut-equipped bolts 12 by tightening the nuts on the threaded shanks of the bolts 12, the interfitting ends of the duct sections are drawn together and positively secured.

The weight of the pipe column formed by the duct sections 11 is borne by a tubular metallic standard 13, the latter being provided at its upper end with a shelf 14 which receives the lower duct section of the pipe column. Also entering this lower duct section is the outlet pipe 15 of the furnace or heater 6, the pipe 15 transmitting furnace gases from the heater 6 to the bottom of the pipe column.

To thoroughly protect the building from fire risks, which may result from the employment of the metallic pipe column, the latter is surrounded and protected by an outer casing or jacket construction 17. This jacket construction comprises concentric inner and outer conduit members 18, the lower of the conduit members resting on the lower of the floors indicated at 3, being surrounded by a seating ring 19. A similar positioning ring is also provided for the uppermost of the floor constructions, as shown in Fig. 1. These rings may be of the split type illustrated in Fig. 6, the spaced ends of the rings being drawn into clamping engagement with the jacket construction by a nut and bolt construction 20.

Preferably, the annular space formed between the inner and outer conduit members is filled with any suitable thermal insulation, so that heat transmission therethrough is highly resisted. The annular space 21 formed between the duct sections 11 and the inner of the conduit members 18, provides an open-ended passage, which leads from the furnace room to the roof of the building, ventilating the furnace room and carrying off heat which may be radiated from the surfaces of the pipe column.

The duct sections 11 and the conduit members 18 are relatively spaced by the provision of a plurality of bow springs 22, the latter being carried at intervals by the inner surfaces of the casing or jacket members 18 and press upon the outer surfaces of the ducts 11. Similar bow springs 23 may be used to relatively space the inner and outer conduit members 18 of the casing or jacket 17. Usually, the springs 23 are disposed in horizontal planes, whereas the springs 22 are arranged in vertical planes.

The portions of the stack construction which project above the roof may be disposed in a false chimney 24, which may be used to impart a conventional chimney appearance to the outer portions of the stack. Also, the upper end of the stack may be protected by an open ventilating hood 25.

In view of the foregoing, it will be seen that the present invention provides an outlet stack or chimney construction for residential buildings composed of relatively inexpensive materials and capable of being quickly and readily erected so that the costs of such construction may be kept at a minimum. While the device is relatively inexpensive, nevertheless, it is highly efficient in the end of providing a furnace vent to the atmosphere and for ventilating an enclosed furnace room. Moreover, from the standpoint of safety, the stack construction does not offer a fire hazard.

What is claimed is:

1. An outlet stack assembly for building heating systems, comprising a vertically disposed pipe column composed of a plurality of relatively separable communicating duct sections, the latter having interfitting end portions, means for securing said interfitting end portions in connected relationship, a protective jacket spaced from and surrounding said pipe column, said jacket being composed of relatively spaced inner and outer conduit sections, bow spring spacers carried by the inner conduit sections and engaging with the duct sections of said column, and complemental bow spring spacers disposed between the inner and outer conduit sections.

2. A waste gas outlet for buildings comprising inner, intermediate and outer concentrically disposed coextensive metallic conduits, and bowed springs fixed to the inner and outer surfaces of said intermediate conduit section, said springs engaging the inner and outer conduit sections and serving to yieldably maintain them in spaced relation from the intermediate section.

3. A waste gas outlet for buildings comprising inner, intermediate and outer concentrically disposed coextensive metallic conduits, bowed springs fixed to the inner and outer surfaces of said intermediate conduit section, said springs engaging the inner and outer conduit sections and serving to yieldably maintain them in spaced relation from the intermediate section, and insulating material positioned in the spaces between the intermediate and outer conduit sections.

HENRY HASENBURGER.
HARVEY WILEY CORBETT.